United States Patent
Kiyohara et al.

(10) Patent No.: US 9,922,258 B2
(45) Date of Patent: Mar. 20, 2018

(54) ON-VEHICLE IMAGE PROCESSING APPARATUS

(71) Applicant: Clarion Co., Ltd., Saitama-shi, Saitama (JP)

(72) Inventors: Masahiro Kiyohara, Tokyo (JP); Takehito Ogata, Tokyo (JP); Satoshi Suzuki, Yokohama (JP); Shoji Muramatsu, Tokyo (JP)

(73) Assignee: Clarion Co., Ltd., Saitama-shi (JP)

( * ) Notice: Subject to any disclaimer, the term of this patent is extended or adjusted under 35 U.S.C. 154(b) by 197 days.

(21) Appl. No.: 14/647,214

(22) PCT Filed: Nov. 27, 2013

(86) PCT No.: PCT/JP2013/081889
§ 371 (c)(1),
(2) Date: May 26, 2015

(87) PCT Pub. No.: WO2014/084251
PCT Pub. Date: Jun. 5, 2014

(65) Prior Publication Data
US 2015/0302261 A1    Oct. 22, 2015

(30) Foreign Application Priority Data

Nov. 27, 2012    (JP) ................................. 2012-259067

(51) Int. Cl.
*G06K 9/00*    (2006.01)
*B60R 1/00*    (2006.01)
(Continued)

(52) U.S. Cl.
CPC ............ *G06K 9/00812* (2013.01); *B60R 1/00* (2013.01); *G06K 9/00791* (2013.01); *G06K 9/46* (2013.01);
(Continued)

(58) Field of Classification Search
CPC .............. B60R 1/00; G06K 2009/4666; G06K 9/00791; G06K 9/00812; G06K 9/46; H04N 7/18
See application file for complete search history.

(56) References Cited

U.S. PATENT DOCUMENTS

| 8,319,614 B2 * | 11/2012 | Takano | ..................... B60R 1/00 340/3.1 |
| 8,446,471 B2 * | 5/2013 | Wu | ....................... G06T 3/4038 348/148 |

(Continued)

FOREIGN PATENT DOCUMENTS

| CN | 102157076 A | 8/2011 |
| EP | 1 826 648 A2 | 8/2007 |

(Continued)

OTHER PUBLICATIONS

International Search Report (PCT/ISA/210) dated Mar. 4, 2014 with English-language translation (two (2) pages).

(Continued)

*Primary Examiner* — Manuchehr Rahmjoo
(74) *Attorney, Agent, or Firm* — Crowell & Moring LLP

(57) ABSTRACT

An on-vehicle image processing apparatus includes: a photographing device configured to photograph a road surface around a vehicle; an image creation section configured to create an overhead view image showing a periphery of the vehicle when looked down from above the vehicle, based on the obtained photographed image; an extraction section configured to extract a road surface sign around the vehicle by using the created overhead view image; a detection section configured to detect one or more noises among at least a road surface noise, an obstruction noise, and an attached substance noise that are to be observed when the extraction section extracts the road surface sign; and a parking frame recognition section configured to recognize a (Continued)

parking frame based on one of a partial photographing region in the photographed image and a partial overhead view region in the overhead view image, depending on the detected noise.

18 Claims, 11 Drawing Sheets

(51) Int. Cl.
   *G06K 9/46* (2006.01)
   *H04N 7/18* (2006.01)
(52) U.S. Cl.
   CPC ....... *G06K 2009/4666* (2013.01); *H04N 7/18* (2013.01)

(56) References Cited

U.S. PATENT DOCUMENTS

| | | | | |
|---|---|---|---|---|
| 8,498,770 | B2* | 7/2013 | Takano | B62D 15/0275 701/28 |
| 9,113,049 | B2* | 8/2015 | Yoon | H04N 7/183 |
| 9,117,122 | B2* | 8/2015 | Choi | G06K 9/00812 |
| 9,467,645 | B2* | 10/2016 | Yoon | G08G 1/14 |
| 9,520,063 | B2* | 12/2016 | Noh | G08G 1/141 |
| 2006/0115121 | A1 | 6/2006 | Saka et al. | |
| 2007/0206833 | A1* | 9/2007 | Otsuka | B60R 21/0134 382/103 |
| 2007/0263902 | A1* | 11/2007 | Higuchi | G05D 1/0246 382/104 |
| 2008/0136673 | A1* | 6/2008 | Jung | B62D 15/0285 340/932.2 |
| 2010/0215218 | A1* | 8/2010 | Takahashi | H04N 7/185 382/104 |
| 2011/0006917 | A1 | 1/2011 | Taniguchi et al. | |
| 2011/0116717 | A1 | 5/2011 | Lee | |
| 2012/0224747 | A1* | 9/2012 | Higuchi | G08G 1/16 382/103 |

FOREIGN PATENT DOCUMENTS

| | | |
|---|---|---|
| EP | 1 962 254 A2 | 8/2008 |
| JP | 2010-244382 A | 10/2010 |
| JP | 2011-16514 A | 1/2011 |
| JP | 2012-166705 A | 9/2012 |
| WO | WO 2010/038223 A1 | 4/2010 |

OTHER PUBLICATIONS

Y. Zhang et al., "Self-detection of optical contamination or occlusion in vehicle vision systems," Optical Engineering, Jun. 1, 2008, pp. 067006-1-067006-6, vol. 47, No. 6, XP55305954.

Extended European Search Report issued in counterpart European Application No. 13857698.8 dated Oct. 7, 2016 (eight (8) pages).

Chinese Office Action issued in counterpart Chinese Application No. 201380060558.2 dated May 31, 2017 with English translation (16 pages).

* cited by examiner

FIG.9

| | FLAG | | | | | NEIGHBOR-HOOD OVERHEAD VIEW REGION R1 | OUTER PERIPHERY OVERHEAD VIEW REGION R2 | NEIGHBOR-HOOD PHOTO-GRAPHING REGION R3 | REMOTE PHOTO-GRAPHING REGION R4 | OUTER PERIPHERY PHOTO-GRAPHING REGION R5 |
|---|---|---|---|---|---|---|---|---|---|---|
| | PARKING FRAME | WHITE LINE | SOLID OBJECT | WATER DROP-LETS | DIRT | | | | | |
| A | 0 | 0 | 0 | 0 | 0 | ○ | ○ | ○ | ○ | ○ |
| B | 1 | 0 | 0 | 0 | 0 | ○ | — | ○ | — | ○ |
| C | 0 | 1 | 0 | 0 | 0 | ○ | ○ | ○ | — | ○ |
| D | 0 | 0 | 1 | 0 | 0 | ○ | ○ | ○ | ○ | ○ |
| E | 0 | 0 | 0 | 1 | 0 | ○ | ○ | ○ | — | ○ |
| F | 0 | 0 | 1 | 1 | 0 | ○ | — | ○ | — | — |
| G | 0 | 0 | 0 | 0 | 1 | — | ○ | ○ | — | — |
| H | 0 | 0 | 0 | 1 | 1 | — | — | — | — | — |
| I | 1 | 0 | 0 | 1 | 0 | ○ | — | ○ | — | — |
| J | 0 | 1 | 0 | 0 | 1 | ○ | ○ | — | — | — |

ON-VEHICLE IMAGE PROCESSING APPARATUS

TECHNICAL FIELD

The present invention relates to an on-vehicle image processing apparatus.

BACKGROUND ART

Conventionally, an apparatus has been proposed which is mounted on a vehicle and recognizes a lane along which the vehicle travels by detecting a white line (lane-dividing line) drawn on a road surface in order to divide lanes, from an image obtained by photographing with a camera. A technology related to this type of apparatus has been known which extracts an edge point corresponding to the white line from a photographed image and determines whether the white line is a solid line or a broken line depending on whether or not a time-series variance value in the number of measurements of the edge point is not more than a threshold value (Patent Literature 1).

CITATION LIST

Patent Literature

PTL1: Japanese Laid Open Patent Publication No. 2010-244382

SUMMARY OF INVENTION

Technical Problem

However, there is the problem that due to factors, such as water droplets and dirt attached to the camera, and photographing environment, a short line constituting a parking frame is erroneously recognized as a long line, such as a road center line, thus deteriorating the accuracy of a parking assist. Further, there is the problem that a means for determining a factor that can lead to deterioration in the accuracy of the parking assist is also affected by other factor at the same time.

Solution to Problem

An on-vehicle image processing apparatus according to a first aspect of the present invention comprises: a photographing device configured to photograph a road surface around a vehicle so as to obtain a photographed image; an image creation section configured to create an overhead view image showing a situation where a circumference of the vehicle is looked down from above the vehicle, based on the photographed image obtained by the photographing device; an extraction section configured to extract a road surface sign around the vehicle by using the overhead view image created by the image creation section; a detection section configured to detect one or more noises among at least a road surface noise, an obstruction noise, and an attached substance noise that are to be observed when the extraction section extracts the road surface sign; and a parking frame recognition section configured to recognize a parking frame based on one of a partial photographing region in the photographed image and a partial overhead view region in the overhead view image, depending on a noise detected by the detection section.

According to a second aspect of the present invention, in the on-vehicle image processing apparatus according to the first aspect, it is preferable to further comprise: a noise flag setting section configured to select a selected image region from among a plurality of partial photographing regions, each corresponding to the partial photographing region, in the photographed image and a plurality of partial overhead view regions, each corresponding to the partial overhead view region, in the overhead view image, depending on the detected noise, so as to set a noise flag corresponding to a state of a noise for the selected image region, wherein: the parking frame recognition section recognizes whether the extracted road surface sign is the parking frame or not by using the selected image region selected by the noise flag setting section.

According to a third aspect of the present invention, in the on-vehicle image processing apparatus according to the second aspect, it is preferable that when the detection section does not detect the noise, the noise flag setting section selects the selected image region from among the plurality of partial photographing regions in the photographed image and the plurality of partial overhead view regions in the overhead view image.

According to a fourth aspect of the present invention, in the on-vehicle image processing apparatus according to the second aspect, it is preferable that when the detection section detects the road surface noise depending on a brightness difference of a line image, the noise flag setting section selects the selected image region from among a partial photographing region in the photographed image which corresponds to a road surface near the vehicle and a partial overhead view region in the overhead view image which corresponds to a road surface near the vehicle.

According to a fifth aspect of the present invention, in the on-vehicle image processing apparatus according to the second aspect, it is preferable that when the detection section detects the road surface noise based on a road surface sign other than a lane marking, the noise flag setting section does not select, as the selected image region, a partial photographing region in the photographed image which corresponds to a road surface remote from the vehicle.

According to a sixth aspect of the present invention, in the on-vehicle image processing apparatus according to the second aspect, it is preferable that when the detection section detects the obstruction noise based on a solid object around the vehicle, the noise flag setting section selects the selected image region from among the plurality of partial photographing regions in the photographed image and the plurality of partial overhead view regions in the overhead view image.

According to a seventh aspect of the present invention, in the on-vehicle image processing apparatus according to the second aspect, it is preferable that when the detection section detects the attached substance noise based on water droplets attached to the photographing device, the noise flag setting section does not select, as the selected image region, a partial photographing region in the photographed image which corresponds to a road surface remote from the vehicle.

According to an eighth aspect of the present invention, in the on-vehicle image processing apparatus according to the second aspect, it is preferable that when the detection section detects the attached substance noise based on dirt attached to the photographing device, the noise flag setting section selects the selected image region from among a partial photographing region in the photographed image which corresponds to a road surface near the vehicle and the plurality of partial overhead view regions in the overhead view image.

According to a ninth aspect of the present invention, in the on-vehicle image processing apparatus according to the second aspect, it is preferable that when the detection section detects the obstruction noise and the attached substance noise based on at least a solid object around the vehicle and water droplets attached to the photographing device, the noise flag setting section selects the selected image region from among a partial photographing region in the photographed image which corresponds to a road surface near the vehicle and a partial overhead view region in the overhead view image which corresponds to a road surface near the vehicle.

According to a tenth aspect of the present invention, in the on-vehicle image processing apparatus according to the second aspect, it is preferable that when the detection section detects the attached substance noise based on at least water droplets and dirt attached to the photographing device, the noise flag setting section does not select the selected image region from among the plurality of partial photographing regions in the photographed image and the plurality of partial overhead view regions in the overhead view image.

According to an eleventh aspect of the present invention, in the on-vehicle image processing apparatus according to the second aspect, it is preferable that when the detection section detects the road surface noise and the attached substance noise based on at least a brightness difference of a line image and water droplets attached to the photographing device, the noise flag setting section selects the selected image region from among a partial photographing region in the photographed image which corresponds to a road surface near the vehicle and a partial overhead view region in the overhead view image which corresponds to a road surface near the vehicle.

According to a twelfth aspect of the present invention, in the on-vehicle image processing apparatus according to the second aspect, it is preferable that when the detection section detects the road surface noise and the attached substance noise based on at least a road surface sign other than a lane marking and dirt attached to the photographing device, the noise flag setting section selects the selected image region from among the plurality of partial overhead view regions in the overhead view image.

According to a thirteenth aspect of the present invention, in the on-vehicle image processing apparatus according to any one of the second to twelfth aspects, it may be preferable to further comprise: a storage section configured to store the noise flag set by the noise flag setting section, wherein: the noise flag setting section selects the selected image region based on the noise flag stored in the storage section when the photographed image of a subsequent frame is obtained by the photographing device.

According to a fourteenth aspect of the present invention, in the on-vehicle image processing apparatus according to the thirteenth aspect, it is preferable that the storage section deletes the noise flag when a predetermined period of time elapses after said noise flag is stored.

According to a fifteenth aspect of the present invention, in the on-vehicle image processing apparatus according to any one of the second to fourteenth aspects, it is preferable that the noise flag setting section relaxes a reference value for setting the noise flag for the selected image region.

According to a sixteenth aspect of the present invention, in the on-vehicle image processing apparatus according to any one of the first to fifteenth aspects, it is preferable that the road surface noise is not a component of an extraction object but exists near the road surface sign or the parking frame that is the extraction object, and the road surface noise includes a parking frame noise or a white line noise that adversely affects extraction of the extraction object.

According to a seventeenth aspect of the present invention, in the on-vehicle image processing apparatus according to any one of the first to fifteenth aspect, it is preferable that the obstruction noise includes a solid object noise that adversely affects extraction of an extraction object due to reflection of an object existing in space other than a substantially flat surface on which the road surface sign or the parking frame that is the extraction object is drawn.

According to an eighteenth aspect of the present invention, in the on-vehicle image processing apparatus according to any one of the first to fifteenth aspects, it is preferable that the attached substance noise includes a water droplet noise or a dirt noise due to an attached substance to the photographing device.

Advantageous Effects of Invention

According to the present invention, the image region is changed depending on the detected noise to recognize a parking frame, thus making it possible to suppress the deterioration in the accuracy of the parking assist.

BRIEF DESCRIPTION OF DRAWINGS

FIG. 9 A diagram schematically illustrating a correspondence relation between a detected noise and an image region to be selected;

DESCRIPTION OF EMBODIMENTS

Figure 1:
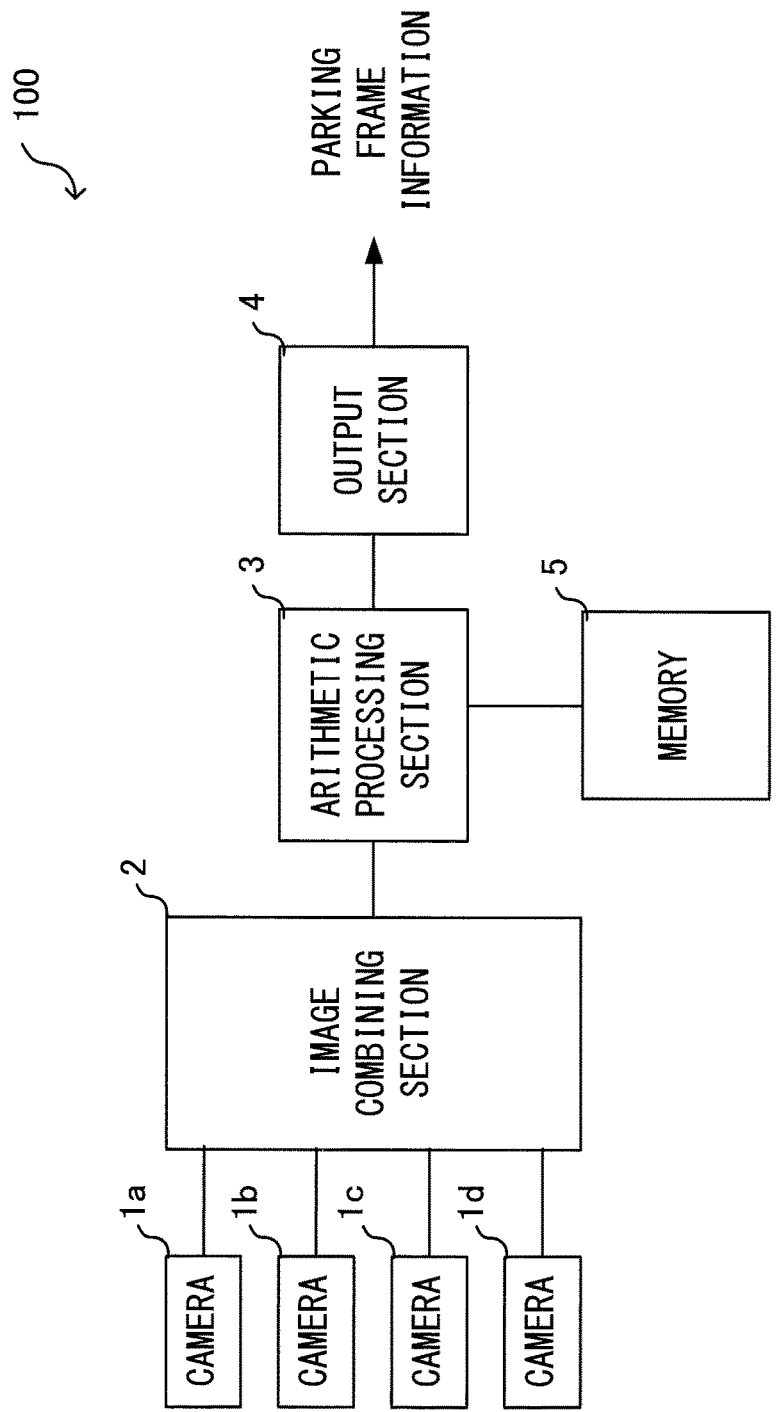
FIG. 1 A block diagram showing the configuration of an on-vehicle image processing apparatus according to an embodiment of the present invention.

FIG. 1 is a block diagram showing the configuration of an on-vehicle image processing apparatus 100 according to an embodiment of the present invention. The on-vehicle image processing apparatus 100 shown in FIG. 1 is intended to be used by being mounted on a vehicle, and includes cameras 1a, 1b, 1c, and 1d, an image combining section 2, an arithmetic processing section 3, an output section 4, and a memory 5.

The cameras 1a to 1d are electronic cameras that respectively photograph the circumference of the vehicle in different photographing ranges, and are respectively disposed on the parts of the vehicle, for example, the body, bumper, and door mirrors. The photographing ranges of these cameras are determined so as to collectively cover the whole circumference of the vehicle. In the present embodiment, a description is made assuming the camera 1a photographs a vehicle forward photographing range, the camera 1b photographs a vehicle left side photographing range, the camera 1c photographs a vehicle right side photographing range, and the camera 1d photographs a vehicle backward photographing range. Photographed images that are respectively obtained at predetermined frame rate intervals by the cameras 1a to 1d are to be outputted to the image combining section 2.

Although the description is made assuming the four cameras 1a to 1d are to respectively photograph the photographing ranges as described above, the number and photographing ranges of the cameras to be mounted on the vehicle are not limited thereto. The whole photographing range covered by the individual cameras may not necessarily cover the whole circumference of the vehicle. A photographed image in an optional photographing range is obtainable by using an optional number of cameras as long as the circumference of the vehicle can be photographed in an appropriate range.

The image combining section 2 is to obtain an overhead view image (top view image) showing a situation where the whole circumference of the vehicle is looked down from above the vehicle, on the basis of the photographed images respectively obtained by the cameras 1a to 1d. The overhead view image is created by subjecting the photographed images obtained by the cameras 1a to 1d to coordinate transformation depending on their respective photographing directions, followed by combining them together. The overhead view image thus obtained by the image combining section 2 is outputted to the arithmetic processing section 3.

The arithmetic processing section 3 is to recognize a parking frame around the vehicle by performing predetermined arithmetic processing on the basis of the photographed images obtained by the cameras 1a to 1d or the overhead view image obtained by the image combining section 2. The content of the arithmetic processing performed by the arithmetic processing section 3 is described in detail later. A recognition result of the parking frame obtained by the arithmetic processing section 3 is outputted to the output section 4. The memory 5 is a volatile storage medium for temporarily storing arithmetic results or the like by the arithmetic processing section 3.

The output section 4 is to output parking frame information about the parking frame around the vehicle on the basis of the recognition result of the parking frame obtained by the arithmetic processing section 3. For example, the output section 4 outputs, as the parking frame information, information indicating a direction of the parking frame with respect to the vehicle, and a distance to the parking frame. The parking frame information is outputted to a master vehicle controller (not shown) coupled to the on-vehicle image processing apparatus 100 so as to be used for a parking assist, travel control, or the like of the vehicle. In a case where it is automatically recognized that a parking lot is present around the circumference, for example, when a parking lot environment is recognized, an image displayed on a monitor can be automatically changed to the overhead view image of the circumference of the vehicle. This suppresses a situation where a parking lot is erroneously detected on a public road, thereby ensuring that an image to be presented to a user is changed at proper timing.

The output section 4 also outputs the parking frame information as relative positional information from one's own vehicle (a subject vehicle) on the basis of the recognition result of the parking frame obtained by the arithmetic processing section 3. For example, the output section 4 outputs positional information about the parking frame in an actual environment, such as end point coordinates of left and right frame lines of the parking frame, and angle and intercept of a parking frame line. The parking frame information is outputted to the master vehicle controller (not shown) coupled to the on-vehicle image processing apparatus 100 so as to be used for the parking assist and the travel control of the vehicle. For example, the parking assist is executable by calculating a travel path up to the parking frame on the basis of a relative positional posture from the subject vehicle to the parking frame, and by detecting brake timing and shift position change timing performed by a driver, and an operation amount for a steering angle. This ensures that even a driver unfamiliar to a driving operation, such as parking in a garage, completes a parking operation in a short time.

Alternatively, the travel path up to the parking frame may be calculated on the basis of the relative positional posture from the subject vehicle to the parking frame, and the amount of control of each of advance, reverse, and turn may be automatically calculated so as to achieve automatic control of the motion of the vehicle according to the calculation results. This ensures that even the driver unfamiliar to the driving operation, such as the parking in the garage, completes the parking operation safely and surely.

Figure 2:
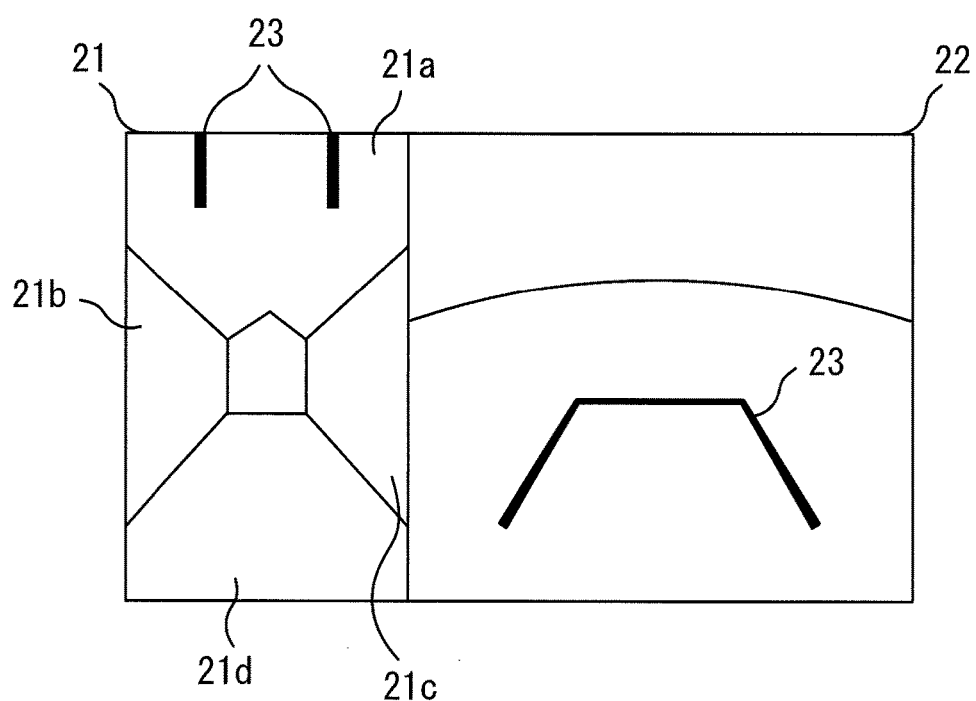
FIG. 2 A diagram showing an example of a display image obtained by combining together an overhead view image and a vehicle forward photographed image.

FIG. 2 is a diagram showing an example of a display image obtained by combining together an overhead view image created by the image combining section 2, and a vehicle forward photographed image photographed by the camera 1a. In FIG. 2, a left image 21 shows the overhead view image, and a right image 22 shows the vehicle forward photographed image.

The overhead view image 21 is made up of four image regions 21a, 21b, 21c, and 21d which respectively correspond to the vehicle forward, left side, right side, and backward areas. The images of these image regions are respectively created on the basis of the images photographed by the cameras 1a to 1d in FIG. 1. Parts of a parking frame line 23 is indicated in the image region 21a. The parking frame line 23 is also indicated in the photographed image 22.

The images as described above are displayed on, for example, a display monitor, not shown in figures, disposed in the vehicle. The image to be displayed as the photographed image 22 is preferably changed corresponding to a traveling direction of the vehicle. For example, when a shift lever of the vehicle is changed to the advance direction, a determination is made that the vehicle is moving forward, and the vehicle forward photographed image photographed by the camera 1a is displayed. When the shift lever of the vehicle is changed to the backward direction, a determination is made that the vehicle is moving backward, and the vehicle backward photographed image photographed by the camera 1d is displayed. This ensures that an appropriate photographed image depending on the traveling direction of the vehicle is presented to the driver of the vehicle so as to perform a driving operation assist during parking or the like.

Figure 3:
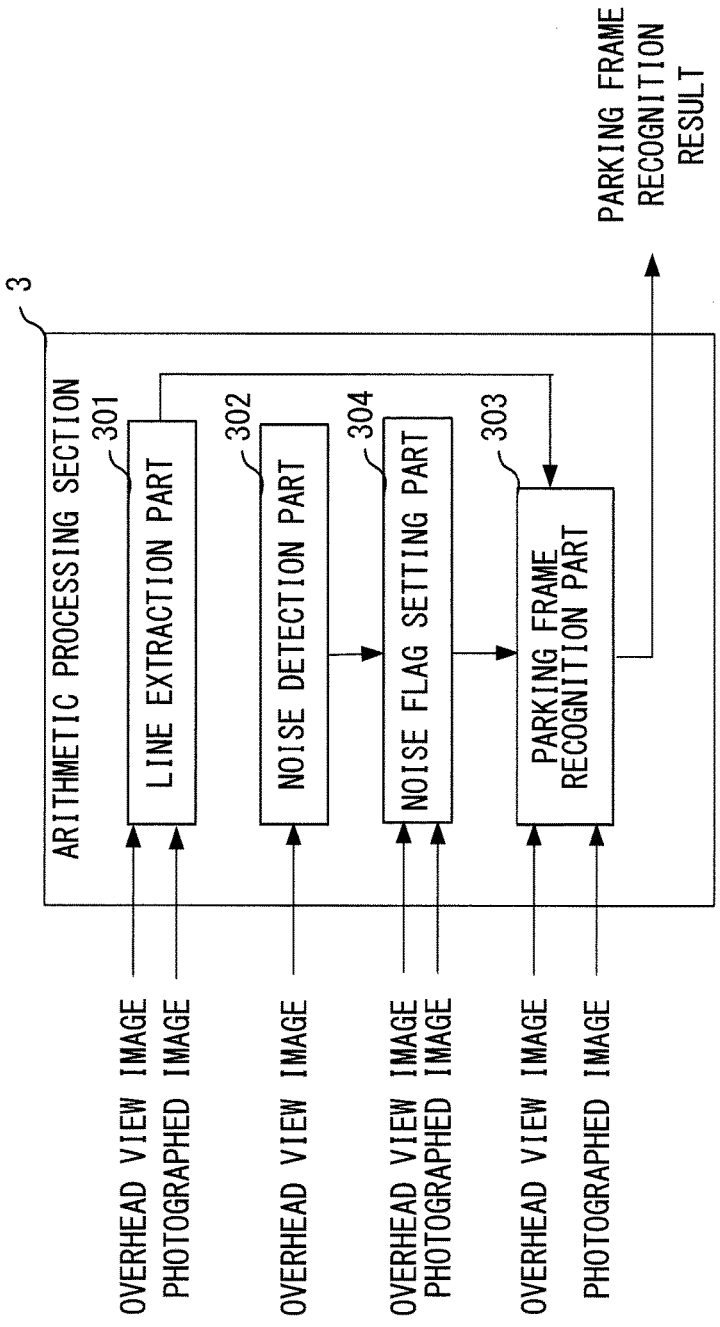
FIG. 3 A control block diagram of arithmetic processing.

Next, the content of the arithmetic processing to be performed by the arithmetic processing section 3 is described. FIG. 3 is a control block diagram of arithmetic processing to be performed by the arithmetic processing section 3. As shown in FIG. 3, the arithmetic processing section 3 functionally has control blocks of a line extraction part 301, a noise detection part 302, a parking frame recognition part 303, and a noise flag setting part 304. For example, the arithmetic processing section 3 is to implement these individual control blocks in FIG. 3 by executing, on a microcomputer, programs stored in a memory in association with these control blocks.

The overhead view image obtained by the image combining section 2 is inputted to the line extraction part 301, the noise detection part 302, and the parking frame recognition part 303 in the arithmetic processing section 3. The line extraction part 301 extracts, as a line image, a line drawn on a traveling surface of the vehicle from the inputted overhead view image. For example, the line drawn on the traveling surface of the vehicle is extractable by extracting, as characteristic points, edge points that reach a predetermined threshold value or more in brightness change when the overhead view image is searched in a lateral direction, and by dividing the characteristics points into groups on the basis of, for example, their positional relationships, and the amount of movement and the direction of movement from the previous processing time. Examples of the lines to be thus extracted include various kinds of road sign lines drawn on a road (center line, lane line or lane marking, lane edge, crosswalk, and the like), and a parking frame line drawn in a parking lot. A line extraction result obtained by the line extraction part 301 is outputted to the noise detection part 302 and the parking frame recognition part 303.

The noise detection part 302 detects the presence or absence of noise by using at least one of the entire region of the photographed images and the entire region of the overhead view image thus inputted. Although the present embodiment illustrates the case where the noise detection part 302 detects a parking frame noise, white line noise, solid object noise, water droplet noise, and dirt noise, the noises to be detected by the noise detection part 302 are not limited to the above examples.

The noise detection part 302 uses a known technology to detect, as the parking frame noise, any two parking frame lines constituting the parking frame which differ widely in either one or more of brightness value and color difference value due to the influence of the afternoon sun, illumination light, or the like. That is, the difference in brightness value or color difference value between different line images thus extracted by the line extraction part 301 which exceeds a predetermined value is detected as the parking frame noise. The noise detection part 302 uses a known technology to determine, as the white line noise, a road surface sign other than the parking frame lines constituting the parking frame which is detected in the vicinity of an extracted line image. When the noise detection part 302 has detected a solid object on the basis of a difference image between the overhead view images corresponding to different times by using a known technology, the noise detection part 302 recognizes the detected solid object as the solid object noise.

The noise detection part 302 uses a known technology to detect water droplets using upper image regions among a plurality of photographed images, and recognizes the water droplets thus detected as the water droplet noise. The noise detection part 302 uses a known technology to extract a difference between a plurality of preceding and succeeding photographed images in terms of time, which have been photographed at different timings, thereby detecting, as the dirt noise, attached substances attached to the lenses of the cameras 1a to 1d.

With the entire image taken as a processing object, the calculation of each of the foregoing noises may be affected when the afternoon sun or illumination light is strong, or when there is the attached substance, such as rain or dirt. Therefore, the noise detection part 302 firstly performs a noise detection over the entire image screen. When a specific noise is detected by the noise detection part 302, either one or more regions of a plurality of partial photographing regions in the photographed images and a plurality of partial overhead view regions in the overhead view image are selectively used in the noise flag setting part 304 to perform a noise detection again. The noise flag setting part 304 sets a noise flag depending on the state of the noise thus redetected, and outputs a noise flag to the parking frame recognition part 303. In the following description, the partial photographing regions and the partial overhead view regions are generally referred to as partial image regions.

The parking frame recognition part 303 determines whether the line extracted by the line extraction part 301 is the parking frame line or not based on a detection result obtained by the noise flag setting part 304. When the determination is made that the extracted line image is the parking frame line, the parking frame recognition part 303 outputs a recognition result of the parking frame corresponding thereto to the output section 4 in FIG. 1.

Figure 4:
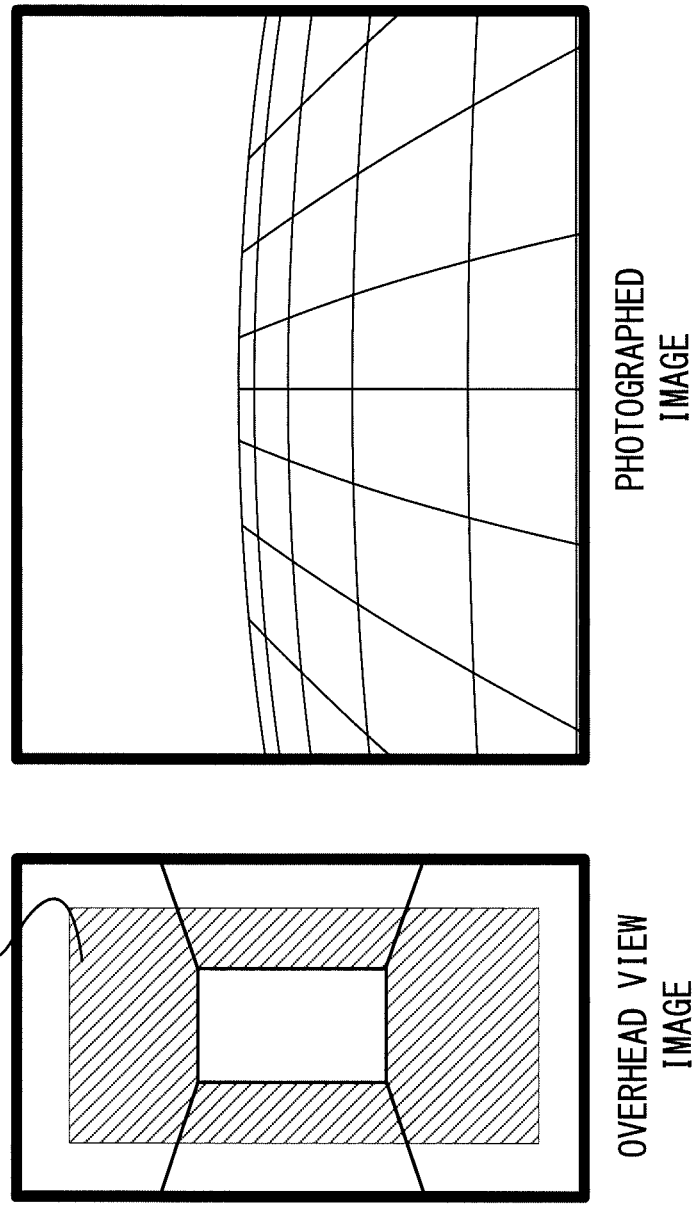
FIG. 4 A diagram showing an image region to be selected for recognizing a parking frame line.
Figure 5:
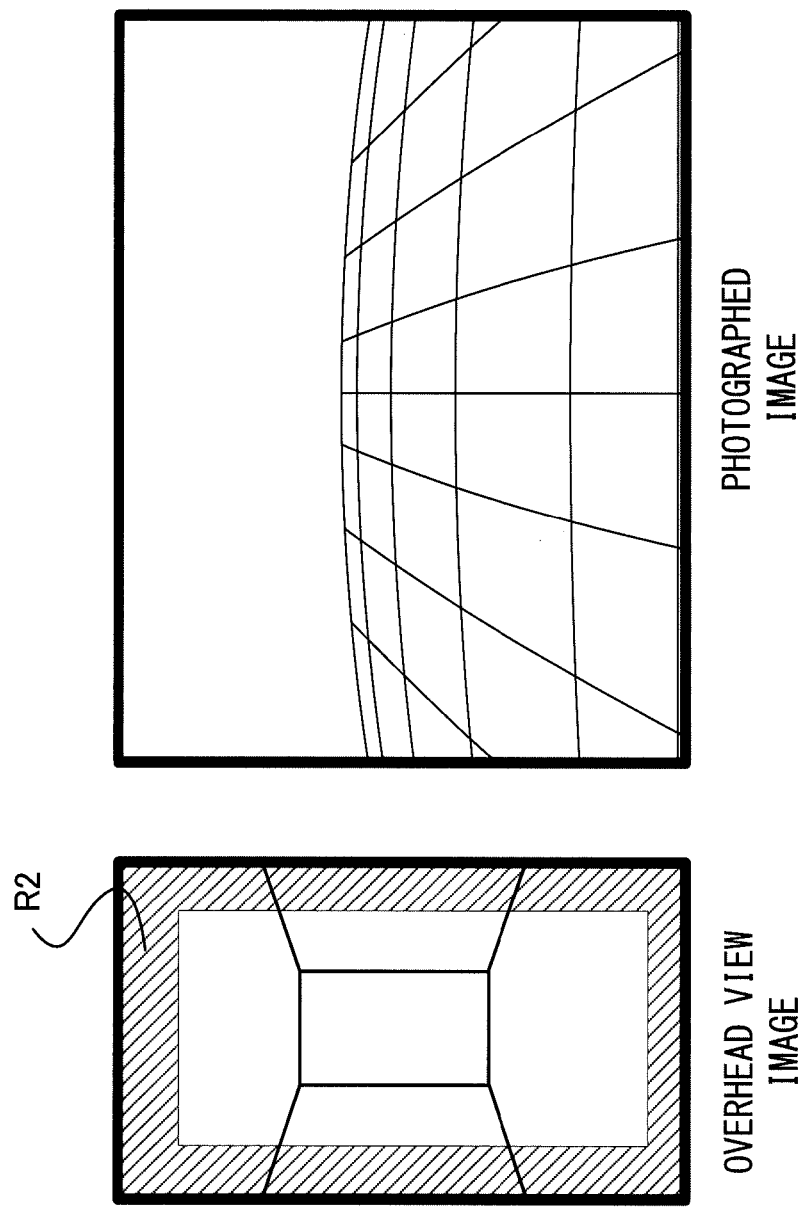
FIG. 5 A diagram showing an image region to be selected for recognizing a parking frame line.

FIGS. 4 to 8 illustrate the partial image regions. FIG. 4 shows an example that a neighborhood overhead view region R1 of the overhead view image, which is indicated by hatching, is the partial image region. The neighborhood overhead view region R1 is, for example, the partial overhead view region corresponding to a neighborhood road surface in the range of, for example, 0 m to 1.5 m with the subject vehicle as the base point. FIG. 5 shows an example that an outer periphery overhead view region R2 of the overhead view image, which is indicated by hatching, is the partial image region. The outer periphery overhead view region R2 is, for example, the partial overhead view region corresponding to a road surface that is farther than the range of, for example, 1.5 m with the subject vehicle as the base point.

Figure 6:
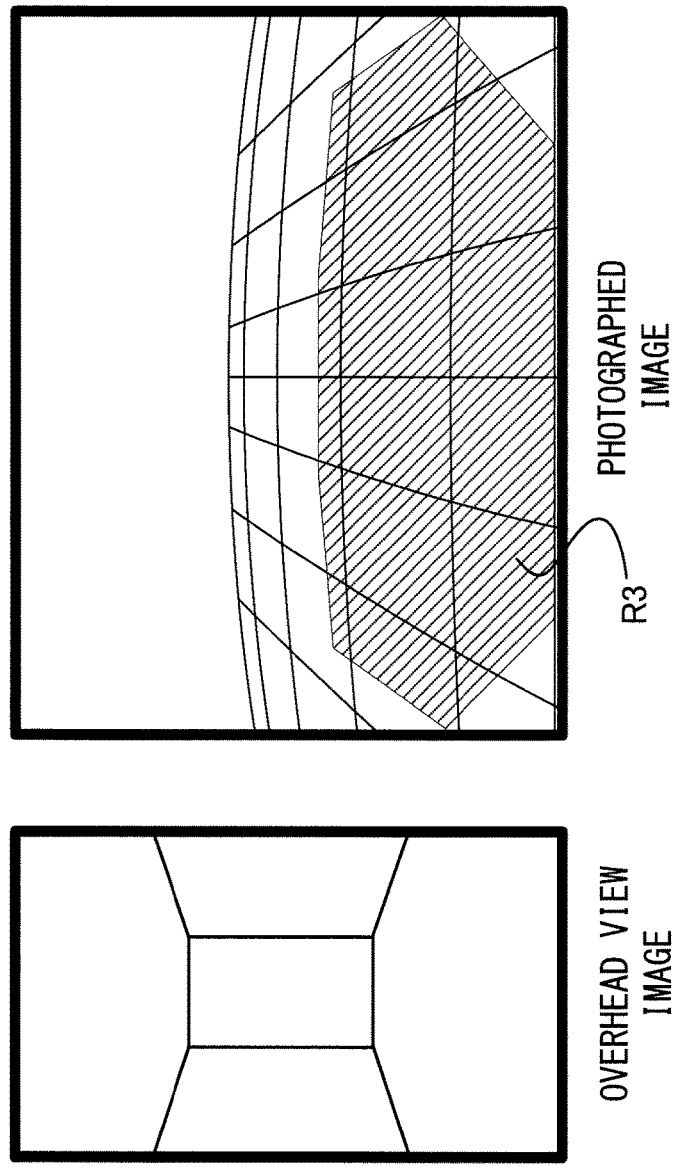
FIG. 6 A diagram showing an image region to be selected for recognizing a parking frame line.
Figure 7:
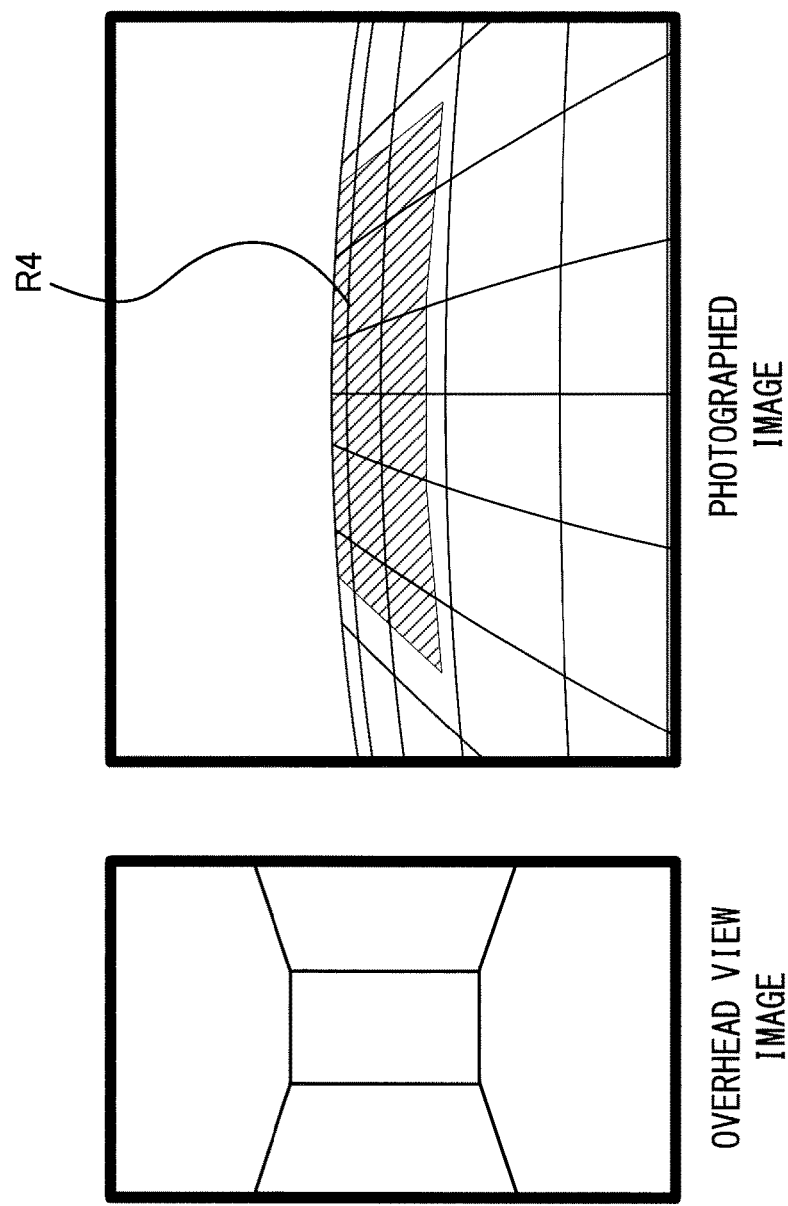
FIG. 7 A diagram showing an image region to be selected for recognizing a parking frame line.
Figure 8:
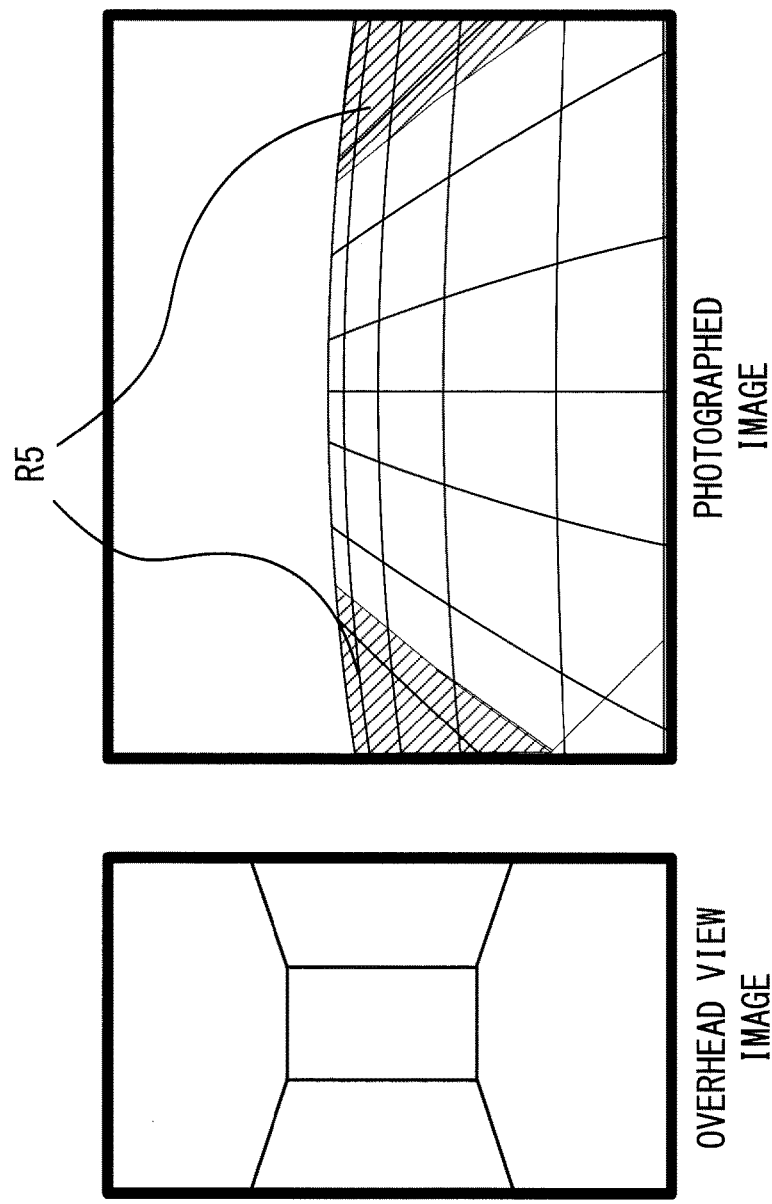
FIG. 8 A diagram showing an image region to be selected for recognizing a parking frame line.

FIG. 6 shows an example that a neighborhood photographing region R3 of the photographed image, which is indicated by hatching, is the partial image region. The neighborhood photographing region R3 is, for example, the partial photographing region corresponding to a neighborhood road surface in the range of, for example, 0.5 m to 8 m ahead of the subject vehicle. FIG. 7 shows an example that a remote photographing region R4 of the photographed image, which is indicated by hatching, is the partial image region. The remote photographing region R4 is, for example, the partial photographing region corresponding to a remote road surface in the range of not less than 8 m ahead of the subject vehicle. FIG. 8 shows an example that outer periphery photographing regions R5 of the photographed image, which are indicated by hatching, are the partial image region. The outer periphery photographing regions R5 are, for example, the partial photographing region corresponding to a road surface in the range of 3 m or more away from the central part of the subject vehicle in terms of width.

FIG. 9 is a diagram schematically illustrating a correspondence relation between the noise detected by the noise detection part 302 and the partial image region to be selected as a selected image region by the noise flag setting part 304. FIG. 9 shows the case where, of the foregoing parking frame noise, white line noise, solid object noise, water droplet noise, and dirt noise, the flag about the noise detected for the extracted line image is set to "1" and the flag about the undetected noise is set to "0". Further in FIG. 9, the partial image region to be selected and the partial image region not to be selected by the noise flag setting part 304 depending on the detected noise are respectively indicated by symbols "o" and "-".

Case A shown in FIG. 9 indicates that when no noise is detected by the noise detection part 302 and the flags about all the noises are set to "0", the noise flag setting part 304 selects, as a selected image region, any one of the neighborhood overhead view region R1, the outer periphery overhead view region R2, the neighborhood photographing region R3, the remote photographing region R4, and the outer periphery photographing region R5 to perform a parking frame recognition. In this case, such a noise as to affect the calculation of other noise is not detected from the extracted line image. Therefore, even when the noise flag setting part 304 uses any one of the partial image regions, it is possible to appropriately output a noise flag, and the occurrence of an erroneous recognition of a parking frame is reducible in the parking frame recognition part 303. In order to discriminate whether the extracted line image is one that corresponds to a long line such as the center line, or a short line such as the parking frame line, the image obtained by photographing an area remote from the subject vehicle (for example, the remote photographing region R4) is preferably taken as the selected image region.

Case B indicates that when only the flag about the parking frame noise is set to "1", the noise flag setting part 304 selects, as a selected image region, any one of the neighborhood overhead view region R1, the neighborhood photographing region R3, and the outer periphery photographing region R5. In other words, the noise flag setting part 304 does not select the remote photographing region R4 as the selected image region. The parking frame noise is detected when the extracted line images differ widely in brightness value as described earlier. The brightness difference between two lines is increased as going farther away from the subject vehicle, thus making it difficult to determine whether or not to correspond to the parking frame lines constituting the same parking frame. Therefore, upon detection of the parking frame noise, the noise flag setting part 304 performs a noise flag setting by using the partial image region obtained by photographing the neighborhood of the subject vehicle. This makes it possible to appropriately output a noise flag, thereby suppressing the occurrence of an erroneous recognition in the parking frame recognition part 303.

Case C indicates that when only the flag about the white line noise is set to "1", the noise flag setting part 304 performs a noise flag calculation by selecting, as a selected image region, any one of the neighborhood overhead view region R1, the outer periphery overhead view region R2, the neighborhood photographing region R3, and the outer periphery photographing region R5. In other words, the noise flag setting part 304 does not select the remote photographing region R4 as the selected image region. The white line noise is detected upon detection of the road sign or the like as described earlier. Therefore, when, in a parking lot where a complicated painting, such as a character, is drawn on a road, the partial image region remote from the subject vehicle is used, there is a possibility that the painting may be erroneously recognized as a parking frame line. In the present embodiment, the noise flag setting part 304 does not use the remote photographing region R4 to recognize a parking frame line. Hence, it is possible to appropriately output a noise flag, thus making it possible to suppress the occurrence of a disadvantage that the road surface sign or the like is recognized as the parking frame line.

Case D indicates that when only the flag about the solid object noise is set to "1", the noise flag setting part 304 performs a noise flag calculation by selecting, as a selected image region, any one of the neighborhood overhead view region R1, the outer periphery overhead view region R2, the neighborhood photographing region R3, the remote photographing region R4, and the outer periphery photographing region R5. On that occasion, even in the case of using either an image obtained by photographing the neighborhood of the subject vehicle or an image obtained by photographing an area remote from the subject vehicle, a parking frame seems less likely to be erroneously recognized due to the solid object. Therefore, even when the noise flag setting part 304 uses any one of the partial image regions, it is possible to reduce the occurrence of an erroneous recognition of the parking frame.

Case E indicates that when only the flag about the water droplet noise is set to "1", the noise flag setting part 304 performs a noise flag calculation by selecting, as a selected image region, any one of the neighborhood overhead view region R1, the outer periphery overhead view region R2, the neighborhood photographing region R3, and the outer periphery photographing region R5. The water droplet noise is detected when water droplets are attached, on the basis of the image information about the upper region of the photographed image. That is, this indicates low reliability of the image information about the upper region of the photographed image. Upon detection of the water droplet noise, it seems difficult to obtain accurate information about a parking frame line from the remote photographing region R4 due to the attachment of the water droplets. In the present embodiment, the noise flag setting part 304 does not select the remote photographing region R4 to recognize a parking frame. Hence, it is possible to appropriately output a noise flag, thus ensuring enhanced accuracy of the parking frame recognition.

Case F indicates that when the flags respectively about the solid object noise and the water droplet noise are set to "1", the noise flag setting part 304 performs a noise flag calculation by selecting, as a selected image region, either one of the neighborhood overhead view region R1 and the neighborhood photographing region R3. In this case, the noise flag setting part 304 does not select, as the selected image region, the remote photographing region R4 having low information accuracy due to the attachment of water droplets. Hence, it is possible to appropriately output a noise flag, thereby making it possible to prevent the deterioration of recognition accuracy for a parking frame.

Case G indicates that when only the flag about the dirt noise is set to "1", the noise flag setting part 304 performs a noise flag calculation by selecting, as a selected image region, any one of the neighborhood overhead view region R1, the outer periphery overhead view region R2, and the neighborhood photographing region R3. The attached dirt exerts a more significant influence on the partial image region obtained by photographing the area remote from the subject vehicle than on the partial image region obtained by photographing the neighborhood of the subject vehicle. In the present embodiment, the partial image regions corresponding to the road surface remote from the subject vehicle, such as the remote photographing region R4 and the outer periphery photographing region R5, are not selected as the selected image region. Hence, it is possible to appropriately output a noise flag, thereby making it possible to prevent the occurrence of an erroneous recognition of a parking frame due to the attached dirt.

Case H indicates that when the flags respectively about the water droplet noise and the dirt noise are set to "1", the noise flag setting part 304 selects none of the partial image regions. In other words, the noise flag setting part 304 is to inhibit selection of a selected image region. When water droplets and the dirt are attached to the photographing devices 1a to 1d, the accuracy of information contained in the photographed image is deteriorated. On that occasion, the noise flag setting part 304 performs no selection of a selected image region, and it is therefore possible to appropriately output a noise flag, thereby making it possible to prevent a parking frame from being erroneously recognized on the basis of the image with low information accuracy.

Case I indicates that when the flags respectively about the parking frame noise and the water droplet noise are set to "1", the noise flag setting part 304 performs a noise flag calculation by selecting, as a selected image region, either one of the neighborhood overhead view region R1 and the neighborhood photographing region R3. In this case, the noise flag setting part 304 does not select, as the selected image region, the remote photographing region R4 having low information accuracy due to the attachment of water droplets. It is therefore possible to appropriately output a noise flag, thereby making it possible to prevent the deterioration of recognition accuracy for a parking frame.

Case J indicates that when the flags respectively about the white line noise and the dirt noise are set to "1", the noise flag setting part 304 performs a noise flag calculation by selecting, as a selected image region, either one of the neighborhood overhead view region R1 and the outer periphery overhead view region R2. The noise flag setting part 304 does not select, as the selected image region, the remote photographing region R4, obtained by photographing an area remote from the subject vehicle, that is susceptible to the attached dirt and in which a road sign or the like drawn on a road surface is liable to be erroneously recognized as a parking frame. It is therefore possible to appropriately output a noise flag, thereby making it possible to prevent an erroneous recognition of a parking frame.

Figure 10:
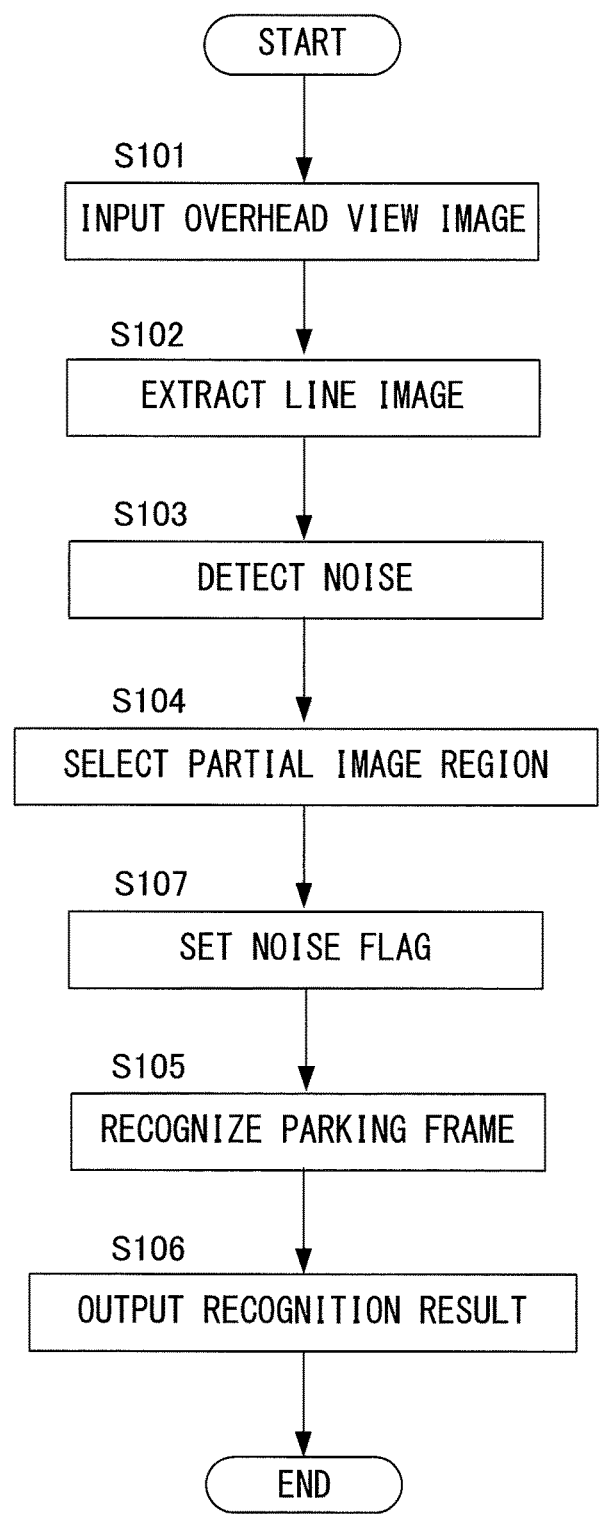
FIG. 10 A flowchart describing processing to be performed by an on-vehicle image processing apparatus according to an embodiment.

The operation of the on-vehicle image processing apparatus 100 is described using the flowchart of FIG. 10. Each processing shown in the flowchart of FIG. 10 is to be performed by causing the arithmetic processing section 3 to execute a program. The program is stored in the memory (not shown), and is to be activated and executed by the arithmetic processing section 3.

An overhead view image created by the image combining section 2 is inputted in step 101, and it proceeds to step S102. On the basis of a brightness change and/or a color difference change when the inputted overhead view image is searched in a lateral direction, a line image corresponding to a line drawn on a traveling surface of a vehicle is extracted in step S102, and it proceeds to step S103. The presence or absence of noise on the line image extracted in step S102 is detected in step S103, and it proceeds to step S104. A partial image region is selected as a selected image region in step S104, depending on the result in step S103, and it proceeds to step S107. A noise detection is performed on the selected image region, and a noise flag corresponding to the state of the detected noise is set in step S107, and it proceeds to step S105.

A determination is made as to whether the line image extracted in step S102 is a parking frame line constituting a parking frame or not in step S105, depending on the noise flag set in step S107. When the determination is made that the line image is the parking frame line, a recognition result is outputted to the output section 4 in step S106, thereby terminating the processing.

The on-vehicle image processing apparatus 100 according to the foregoing embodiment produces the following advantageous effects.

(1) The on-vehicle image processing apparatus 100 includes the cameras 1a to 1d that respectively photograph a road surface around the circumference of a vehicle to obtain photographed images, the image combining section 2 to create an overhead view image showing a situation where the circumference of the vehicle is looked down from above the vehicle, and the arithmetic processing section 3. The arithmetic processing section 3 includes the line extraction part 301 to extract a line image corresponding to a lane on the road surface around the circumference of the vehicle by using the overhead view image created by the image combining section 2, the noise detection part 302 to detect noise in the extracted line image, the noise flag setting part 304 to set a noise flag on the basis of either one of the partial image region in the photographed image and the partial overhead view region in the overhead view image, depending on the noise detected by the noise detection part 302, and the parking frame recognition part 303 to recognize a parking frame from the noise flag set by the noise flag setting part 304 and from the line image extracted by the line extraction part 301. Specifically, the noise flag setting part 304 selects a selected image region from among a plurality of partial photographing regions in the photographed image and a plurality of partial overhead view regions in the overhead view image depending on the detected noise, and sets a noise flag using the selected image region. The parking frame recognition part 303 recognizes whether or not the extracted line image is a parking frame on the basis of the set noise flag. A suitable partial image region is selectable depending on the detected noise, and hence the occurrence of an erroneous recognition of the parking frame can be suppressed to improve the accuracy of a parking assist.

(2) When the noise detection 302 detects the parking frame noise depending on the brightness difference of a line image, the noise flag setting part 304 selects a selected image region from among the neighborhood photographing region R3 in the photographed image which is the partial photographing region corresponding to a road surface near the vehicle and the neighborhood overhead view region R1 in the overhead view image which is the partial photographing region corresponding to a road surface near the vehicle. The use of the partial image region near the vehicle suppresses the occurrence of the situation in which it is difficult to determine whether or not two line images correspond to parking frame lines constituting the same parking frame due to an increase of brightness difference between the two line images. This ensures improvement of the recognition accuracy for the parking frame.

(3) The noise flag setting part 304 does not select the remote photographing region R4 of the photographed image as a selected image region when the noise detection part 302 detects the white line noise on the basis of a road surface sign other than a lane marking. When, in a parking lot where a complicated painting, such as a character, is drawn on a road, the photographed image that is remote from the subject vehicle is used, there may be a possibility that the painting is erroneously recognized as a parking frame line constituting a parking frame. With the present embodiment, the remote photographing region R4 is not selected as a selected image region. It is therefore possible to suppress the occurrence of the disadvantage that the road surface sign or the like is recognized as a parking frame line, thereby improving the accuracy of a parking assist.

(4) The noise flag setting part 304 selects a selected image region from among a plurality of partial photographing regions in the photographed image and a plurality of partial overhead view regions in the overhead view image when the noise detection part 302 detects the solid object noise on the basis of a solid object around the vehicle. Whether an image obtained by photographing the neighborhood of the subject vehicle or an image obtained by photographing an area remote from the subject vehicle is used, a parking frame is less likely to be erroneously recognized due to the solid object. Therefore, even when the parking frame recognition part 303 uses any one of the partial image regions, it is possible to reduce the occurrence of an erroneous recognition of a parking frame line.

(5) The noise flag setting part 304 is to inhibit selection of the remote photographing region R4 when the noise detection part 302 detects the water droplet noise on the basis of water droplets attached to the photographing devices 1a to 1d. In this case, a parking frame recognition is performed without using image information in a photographed image which corresponds to a partial image region from which the water droplet noise is detected. This ensures accurate execution of a parking assist.

(6) The noise flag setting part 304 selects a selected image region from among the neighborhood photographing region R3, the neighborhood overhead view region R1, and the outer periphery overhead view region R2 when the noise detection part 302 detects the dirt noise on the basis of dirt attached to the photographing devices 1a to 1d. Accordingly, the partial image region obtained by photographing an area remote from the subject vehicle, which is significantly affected by the attached dirt, is not selected as the selected image region, thus making it possible to suppress the occurrence of an erroneous recognition of a parking frame due to the attached dirt.

(7) The noise flag setting part 304 selects a selected image region from among the neighborhood photographing region R3 and the neighborhood overhead view region R1 when the noise detection part 302 detects the solid object noise and the water droplet noise on the basis of a solid object around the vehicle and water droplets attached to the photographing devices 1a to 1d. Accordingly, the remote photographing region R4, whose information accuracy is deteriorated due to the attachment of the water droplets, is not selected as the selected image region, thus making it possible to prevent deterioration of recognition accuracy for a parking frame.

(8) The noise flag setting part 304 does not select a selected image region from among a plurality of partial photographing regions in the photographed image and a plurality of partial overhead view regions in the overhead view image when the noise detection part 302 detects the water droplet noise and the dirt noise on the basis of water droplets and dirt attached to the photographing devices 1a to 1d. When the water droplets and the dirt are attached to the photographing devices 1a to 1d, the accuracy of information contained in the photographed image is low. In this case, none of the partial image regions is selected as the selected image region, thus making it possible to prevent a parking frame from being erroneously recognized on the basis of the image with the low information accuracy.

(9) The noise flag setting part 304 selects a selected image region from among the neighborhood photographing region R3 and the neighborhood overhead view region R1 when the noise detection part 302 detects the parking frame noise and the water droplet noise on the basis of a brightness difference of a line image and water droplets attached to the photographing devices 1a to 1d. In this case, similarly to the above (2) and (5), the remote photographing region R4 with low recognition accuracy for a parking frame is not selected as the selected image region, thus making it possible to prevent a parking frame from being erroneously recognized.

(10) The noise flag setting part 304 selects a selected image region from the neighborhood overhead view region R1 and the outer periphery overhead view region R2 when the noise detection section 302 detects the white line noise and the dirt noise on the basis of a road surface sign other than a lane marking, and dirt attached to the photographing devices 1a to 1d. Accordingly, the noise flag setting part 304 does not select, as the selected image region, the remote photographing region R4 obtained by photographing an area remote from the subject vehicle, which is susceptible to the attached dirt and is liable to lead to an erroneous recognition of a road sign or the like drawn on a road surface as a parking frame line. This makes it possible to prevent a parking frame from being erroneously recognized.

The on-vehicle image processing apparatus according to the foregoing embodiment may be modified as follows.

(Modified Embodiment 1)

In one aspect of the present invention, the noise flag setting part 304 may be configured not to perform the selection of the partial image region. In this case, the parking frame recognition part 303 may recognize a parking frame using each of the neighborhood overhead view region R1, the outer periphery overhead view region R2, the neighborhood photographing region R3, the remote photographing region R4, and the outer periphery photographing region R5 so as to select a recognition result depending on a detection result of the noise detection part 302. For example, in the case B shown in FIG. 9, any one of the recognition result using the neighborhood overhead view region R1, the recognition result using the neighborhood photographing region R3, and the recognition result using the outer periphery photographing region R5 may be selected and outputted to the output section 4.

(Modified Embodiment 2)

Figure 11:
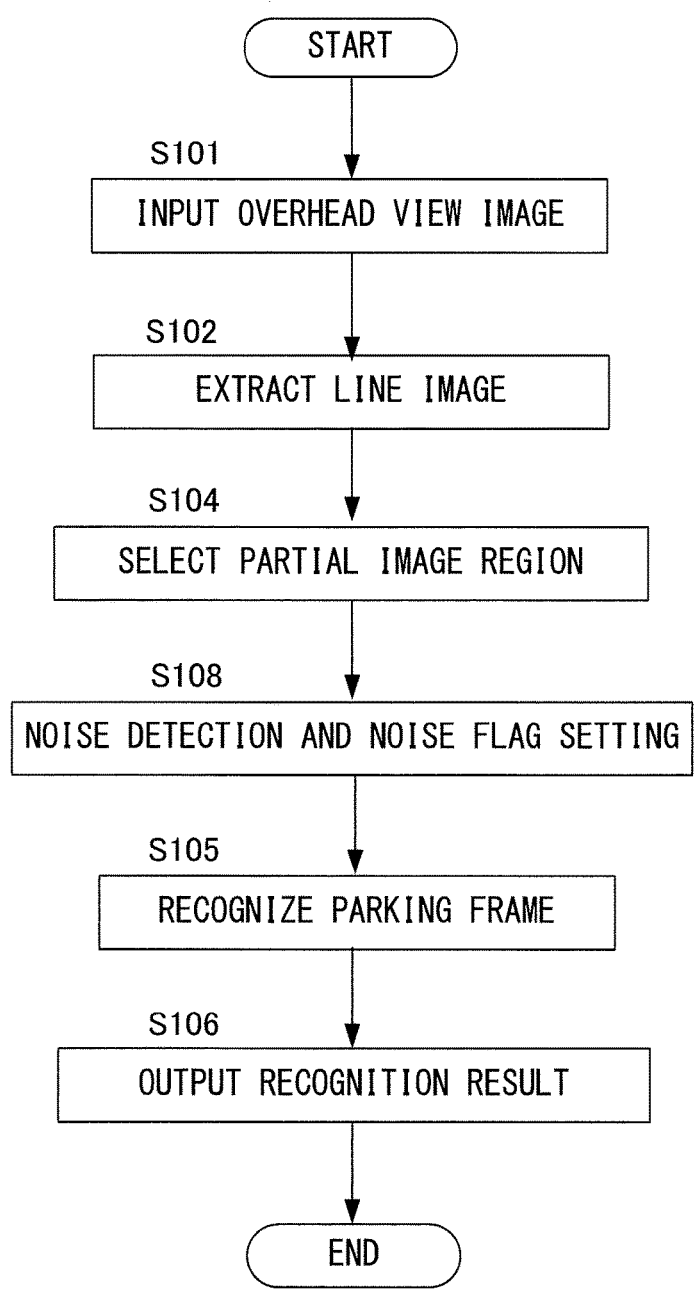
FIG. 11 A flowchart describing processing to be performed by an on-vehicle image processing apparatus according to a modified embodiment.

In the on-vehicle image processing apparatus 100 of the embodiment, as shown in the flowchart of FIG. 10, the noise detection in step S103 and the noise flag setting in step S107 are sequentially executed so as to select a partial image region and calculate the noise flag with respect to the region in a single frame. The situations under the strong influence of the afternoon sun or illumination light, and the presence of attached substance, such as rain, dirt or the like, are not completely different on a frame basis, but are often approximately the same for a certain period of time. Taking into consideration this characteristics, the execution results of the noise detection and the noise flag setting may be stored in the memory 5, and the results of the noise detection and the noise flag setting thus stored may be read and outputted to the parking frame recognition part 303 in the processing for the subsequent frame. That is, as shown in the flowchart of FIG. 11, after a partial image region is selected in step S104, the noise detection result and the noise flag setting result may be read from the memory 5 in step S108, and it may proceed to step S105. This contributes to reducing processing load.

(Modified Embodiment 3)

In the above modified embodiment 2, the noise detection result and the noise setting result stored in the memory 5 may be cleared (deleted) every time a certain period of time elapses, and a noise detection and a noise flag setting may be performed again. Consequently, even when all the partial image regions are not to be used for setting a noise flag as shown in, for example, the case H, these are returnable after the elapse of a certain period of time.

(Modified Embodiment 4)

The foregoing embodiment and the modified embodiments 1 to 3 have described the embodiment that upon detection of a certain noise, the output of the noise is suppressed by changing the processing region. In place of such an aspect that a certain region is excluded so as to suppress the output of the noise, a configuration in which the noise flag setting part 304 relaxes a threshold value (reference value) for enabling a noise flag in the corresponding selected image region so that the noise flag is easily enabled upon detection of a noise, is also included in an aspect of the present invention. Consequently, the noise flag is easily enabled depending on the noise detection result, and hence a parking frame is less likely to be recognized, thus preventing the parking frame from being erroneously recognized.

The present invention is not limited to the foregoing embodiments as long as the characteristics of the present invention are not impaired. Other embodiments that are conceivable within the scope of the technical concept of the present invention are also included in the scope of the present invention.

The disclosure of the following priority application is incorporated herein by reference.

Japanese Patent Application No. 2012-259067 (filed Nov. 27, 2012)

REFERENCE SIGNS LIST 1a, 1b, 1c, 1d camera
2 image combining section
3 arithmetic processing section
5 memory
100 on-vehicle image processing apparatus
301 line extraction part
302 noise detection part
303 parking frame recognition part
304 noise flag setting part

The invention claimed is:

1. An on-vehicle image processing apparatus, comprising:
a photographing device configured to photograph a road surface around a vehicle so as to obtain a photographed image;
an image creation section configured to create an overhead view image showing a periphery of the vehicle when looked down from above the vehicle, based on the photographed image obtained by the photographing device;
an extraction section configured to extract a road surface sign around the vehicle by using the overhead view image created by the image creation section;
a detection section configured to detect one or more noises among at least a road surface noise, an obstruction noise, and an attached substance noise that are to be observed when the extraction section extracts the road surface sign;
a correspondence relation information section configured to include information indicating regions that are to be selected from among a plurality of partial photographing regions in the photographed image and a plurality of partial overhead view regions in the overhead view image based on the one or more noises detected by the detection section;
a selection section configured to select a selected image region from among the plurality of partial photographing regions in the photographed image and the plurality of partial overhead view regions in the overhead view image, based on the information included in the correspondence relation information section and the one or more noises detected by the detection section;
a noise flag setting section configured to perform noise detection on the selected image region; and
a parking frame recognition section configured to recognize a parking frame in the selected image region based on results of the noise detection on the selected image region performed by the noise flag setting section.

2. The on-vehicle image processing apparatus according to claim 1, wherein:
the noise flag setting section sets a noise flag corresponding to a state of a noise for the selected image region based on the noise detection, and wherein:
the parking frame recognition section recognizes whether the extracted road surface sign is the parking frame or not in the selected image region.

3. The on-vehicle image processing apparatus according to claim 2, wherein:
when the detection section does not detect the noise, the selection section selects the selected image region from any one among the plurality of partial photographing regions in the photographed image and the plurality of partial overhead view regions in the overhead view image.

4. The on-vehicle image processing apparatus according to claim 2, wherein:
when the detection section detects the road surface noise based on a brightness difference of a line image, the selection section selects the selected image region from among a partial photographing region in the photographed image which corresponds to a road surface near the vehicle and a partial overhead view region in the overhead view image which corresponds to a road surface near the vehicle.

5. The on-vehicle image processing apparatus according to claim 2, wherein:
when the detection section detects the road surface noise based on a road surface sign other than a lane marking, the selection section does not select, as the selected image region, a partial photographing region in the photographed image which corresponds to a road surface remote from the vehicle.

6. The on-vehicle image processing apparatus according to claim 2, wherein:
when the detection section detects the obstruction noise based on a solid object around the vehicle, the selection section selects the selected image region from among the plurality of partial photographing regions in the photographed image and the plurality of partial overhead view regions in the overhead view image.

7. The on-vehicle image processing apparatus according to claim 2, wherein:
when the detection section detects the attached substance noise based on water droplets attached to the photographing device, the selection section does not select, as the selected image region, a partial photographing region in the photographed image which corresponds to a road surface remote from the vehicle.

8. The on-vehicle image processing apparatus according to claim 2, wherein:
when the detection section detects the attached substance noise based on dirt attached to the photographing device, the selection section selects the selected image region from among a partial photographing region in the photographed image which corresponds to a road surface near the vehicle and the plurality of partial overhead view regions in the overhead view image.

9. The on-vehicle image processing apparatus according to claim 2, wherein:
when the detection section detects the obstruction noise and the attached substance noise based on at least a solid object around the vehicle and water droplets attached to the photographing device, the selection section selects the selected image region from among a partial photographing region in the photographed image which corresponds to a road surface near the vehicle and a partial overhead view region in the overhead view image which corresponds to a road surface near the vehicle.

10. The on-vehicle image processing apparatus according to claim 2, wherein:
when the detection section detects the attached substance noise based on at least water droplets and dirt attached to the photographing device, the selection section does not select the selected image region from among the plurality of partial photographing regions in the photographed image and the plurality of partial overhead view regions in the overhead view image.

11. The on-vehicle image processing apparatus according to claim 2, wherein:
when the detection section detects the road surface noise and the attached substance noise based on at least a brightness difference of a line image and water droplets attached to the photographing device, the selection section selects the selected image region from among a partial photographing region in the photographed image which corresponds to a road surface near the vehicle and a partial overhead view region in the overhead view image which corresponds to a road surface near the vehicle.

12. The on-vehicle image processing apparatus according to claim 2, wherein:
when the detection section detects the road surface noise and the attached substance noise based on at least a road surface sign other than a lane marking and dirt attached to the photographing device, the selection section selects the selected image region from among the plurality of partial overhead view regions in the overhead view image.

13. The on-vehicle image processing apparatus according to claim 2, further comprising:
a storage section configured to store the noise flag set by the noise flag setting section, wherein:
the selection section selects the selected image region based on the noise flag stored in the storage section when the photographed image of a subsequent frame is obtained by the photographing device.

14. The on-vehicle image processing apparatus according to claim 13, wherein:
the storage section deletes the noise flag when a predetermined period of time elapses after said noise flag is stored.

15. The on-vehicle image processing apparatus according to claim 2, wherein:
the selection section relaxes a reference value for setting the noise flag for the selected image region.

16. The on-vehicle image processing apparatus according to claim 1, wherein:
the road surface noise is not part of an extraction object but exists near the road surface sign or the parking frame that is the extraction object, and the road surface noise includes a parking frame noise or a white line noise that adversely affects extraction of the extraction object.

17. The on-vehicle image processing apparatus according to claim 1, wherein:
the obstruction noise includes a solid object noise that adversely affects extraction of an extraction object due to reflection of an object existing in space other than a substantially flat surface on which the road surface sign or the parking frame that is the extraction object is drawn.

18. The on-vehicle image processing apparatus according to claim 1, wherein:
the attached substance noise includes a water droplet noise or a dirt noise due to an attached substance to the photographing device.

* * * * *